United States Patent
Ishikawa

(10) Patent No.: US 6,416,694 B1
(45) Date of Patent: Jul. 9, 2002

(54) INJECTION CONTROLLING METHOD FOR AN INJECTION MOLDING MACHINE

(75) Inventor: Atsushi Ishikawa, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/431,227

(22) Filed: Nov. 1, 1999

(30) Foreign Application Priority Data

Dec. 10, 1998 (JP) .......................................... 10-351151

(51) Int. Cl.$^7$ ............................................... B29C 45/77
(52) U.S. Cl. .................... 264/40.1; 264/40.1; 264/40.5; 264/328.8; 425/145; 425/542
(58) Field of Search ................................ 264/40.1, 40.5, 264/40.7, 328.1, 328.8, 328.13; 425/145, 147, 542

(56) References Cited

U.S. PATENT DOCUMENTS

| 3,396,431 A | | 8/1968 | Kovach et al. |
| 5,028,377 A | | 7/1991 | Hendry |
| 5,492,670 A | | 2/1996 | Minamimura et al. |
| 5,554,326 A | | 9/1996 | Nakazawa et al. |
| 5,770,131 A | * | 6/1998 | Bubel et al. |
| 5,786,999 A | * | 7/1998 | Spahr et al. |
| 6,042,760 A | * | 3/2000 | Nakazawa et al. ......... 264/40.1 |

FOREIGN PATENT DOCUMENTS

| DE | 1 167 008 | 4/1964 |
| DE | 1 554 957 | 2/1970 |
| JP | 61-181626 | 8/1986 |
| JP | 6-000852 | 1/1994 |
| JP | 7-299850 | 11/1995 |
| JP | 9-174626 | 7/1997 |
| JP | 10-329180 | 12/1998 |

* cited by examiner

Primary Examiner—Jill L. Heitbrink
(74) Attorney, Agent, or Firm—Arent Fox Kintner Plotkin & Kahn, PLLC

(57) ABSTRACT

A method and apparatus for controlling injection in an injection molding machine meters and controls injection shot. Injection shot is metered into a heating cylinder of the injection molding machine, and the injection shot is then injected into a mold by advancing an injection screw in an injection direction within the heating cylinder. The injection screw is then retracted within the heating cylinder.

14 Claims, 5 Drawing Sheets

$S3 < S2 < S1$

S3 < S2 < S4 < S5 < S1

$S3 < S2 < S4 < S5 < S1$

INJECTION CONTROLLING METHOD FOR AN INJECTION MOLDING MACHINE

BACKGROUND OF THE INVENTION

1. Field of the Invention

The present invention relates to an injection controlling method for an injection molding machine and, more particularly, to an injection controlling method suitable for molding an article having a small thickness.

2. Description of the Related Art

Motor-driven injection molding machines have increasingly been used in recent years, in which a servo motor is used as a substitute for a hydraulic actuator. Operations of such injection devices using servo motors are summarized below.

A screw is rotated with a servo motor for screw rotation in a plasticization/metering process. The screw is located within a heating cylinder. A resin is fed from a hopper to a rear portion of the screw in the heating cylinder. Rotation of the screw melts and advances a certain metered amount of the supplied resin to a nose portion of the heating cylinder. During this time, the screw is retracted due to pressure (back pressure) of the molten resin stored in the nose portion of the cylinder.

An injection shaft is directly connected to a rear end portion of the screw. The injection shaft is rotatably supported by a pressure plate through a bearing. The injection shaft is driven in the axial direction by a servo motor for injection that is supported on the pressure plate. The pressure plate moves forward and backward along guide bars in response to the operation of the servo motor for injection through a ball screw. The above-mentioned back pressure of the molten resin is detected by using a load cell and is controlled with a feedback control loop, as will be described more in detail below.

Then, in a filling process, the pressure plate is advanced by driving the servo motor for injection. The nose portion of the screw serves as a piston to fill a mold with the molten resin.

The molten resin fills the space within the cavity at the end of the filling process. At this point, the control mode for the advancing motion of the screw is switched from a velocity control mode to a pressure control mode. This switching is referred to as a "V (velocity) to P (pressure) switching" and affects the quality of resultant molded articles.

Following the V-P switching, the resin within the mold cavity is allowed to cool under a predetermined pressure. This process is referred to as a dwelling process. In this dwelling process, the pressure of the resin is controlled in the feedback control loop as in the above-mentioned back pressure control.

Then, the injection device returns to the plasticization/metering process after the completion of the dwelling process. A mold clamping device performs an eject operation for ejecting a solid product out of the mold in parallel with the plasticization/metering process. In the eject operation, the mold is opened to remove the solidified product from the mold by an ejector mechanism, and then the mold is closed for the filling process.

As well known in the art, injection control is performed in the filling process. The injection control should be changed depending on the thickness of an article. If the injection control for a molded product having a large thickness is applied to the molding of a thin molded article, a number of problems will arise. For example, with the application of such injection control to the molding of a thin molded article, an excessive pressure exerted to the molded article may generate flash and/or residual stress, which may result in a defective or flawed article. Therefore, the pressure exerted to the molded article should be reduced. However, the conventional injection control methods cannot effectively reduce the pressure suddenly because the maximum traveling velocity or the acceleration of the screw is smaller in the dwelling process than in the filling process.

SUMMARY OF THE INVENTION

Therefore, an object of the present invention is to provide an injection control method which is improved to ensure weight and dimensional stability of a molded article between adjacent shots in molding a thin molded article.

The present invention is applied to an injection molding machine which carries out a molding cycle including a resin plasticization/metering process and a resin filling process.

Figure 1:
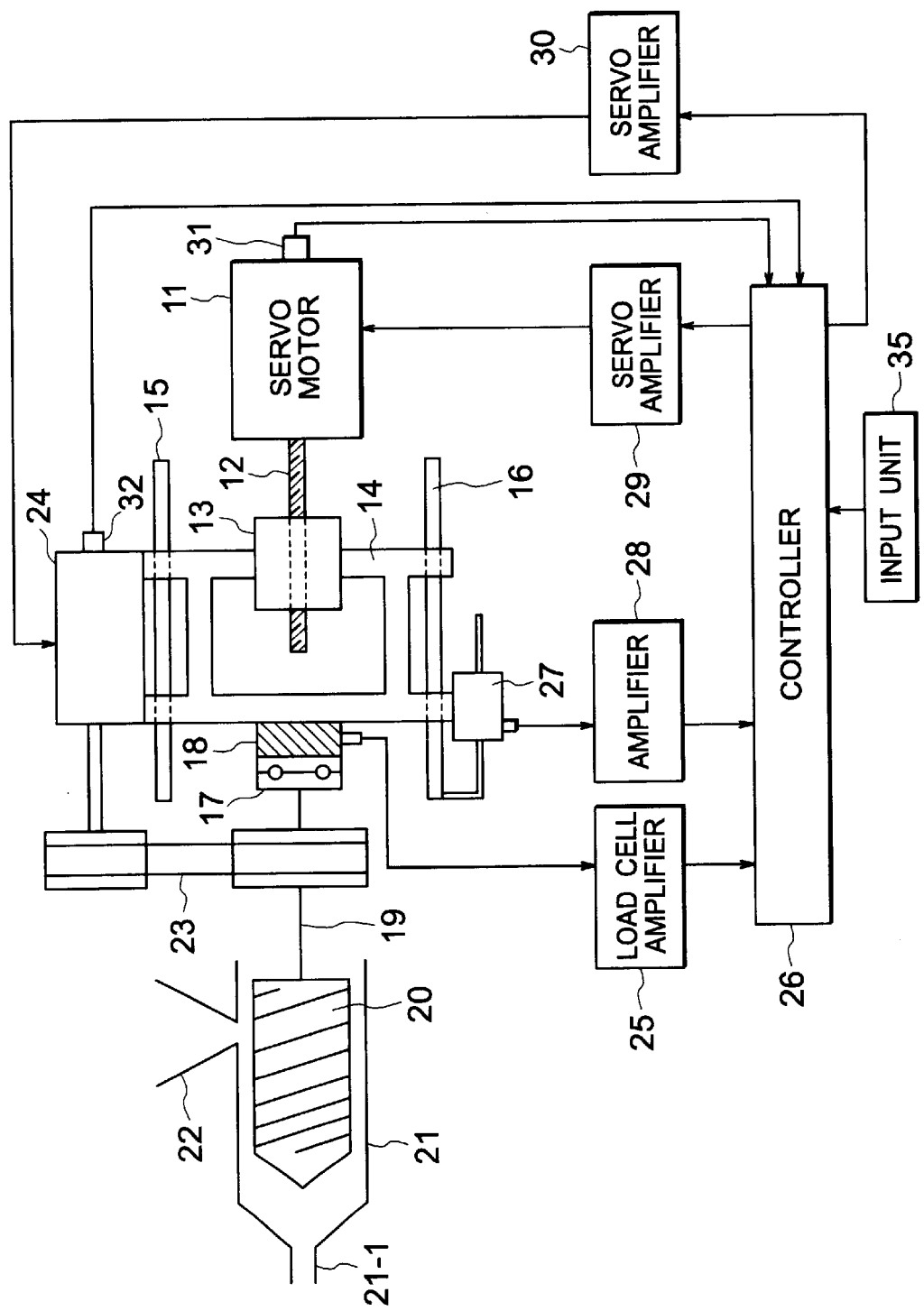
FIG. 1 is a view illustrating a schematic configuration of an electric injection molding machine.

DESCRIPTION OF THE PREFERRED EMBODIMENT:

Referring to FIG. 1, a motor-driven injection molding machine is described which comprises an injection device operated by servo motors, for the purpose of facilitating the understanding of the present invention. The injection device rotates a screw by means of transmitting a rotation motion of a servo motor into a linear motion through a ball screw and a nut.

In FIG. 1, rotation of a servo motor 11 for injection is transmitted to a ball screw 12. The nut 13 is fixed to a pressure plate 14 such that the nut 13 advances and is retracted in response to the rotation of the ball screw 12. The pressure plate 14 is movable along guide bars 15 and 16 which are fixed to a base frame (not shown). The back and forth movement of the pressure plate 14 is transmitted to a screw 20 via a bearing 17, a load cell 18, and an injection shaft 19. The screw 20 is positioned within a heating cylinder 21 such that the screw 20 is rotatable and movable in the axial direction. The heating cylinder 21 corresponding to the rear portion of the screw 20 is equipped with a hopper 22 for feeding a resin. The rotation motion of a servo motor 24 for screw rotation is transmitted to the injection shaft 19 via a coupling member 23 comprised of, for example, a belt and a pulley. In other words, the screw 20 rotates as a result that the injection shaft 19 is rotation driven by the servo motor 24 for the screw rotation.

In the plasticization/metering process, a molten resin is stored in the heating cylinder 21 at the head of the screw 20, that is, on the side of a nozzle 21-1, when the screw 20 is retracted while rotating in the heating cylinder 21. By advancing the screw 20 in the heating cylinder 21, the molten resin stored in front of the screw 20 is filled in a mold and pressurized for molding. A force acting upon the resin is detected by the load cell 18 as a reaction force. The detected pressure is amplified by a load cell amplifier 25 and is then supplied to a controller 26.

A position detector 27 is attached to the pressure plate 14 for detecting an amount of movement of the screw 20. A detection signal from the position detector 27 is amplified by an amplifier 28 and is then supplied to the controller 26. The controller 26 supplies a current (torque) command to servo amplifiers 29 and 30 depending on the above-mentioned processes for each of the values set by an operator. The servo amplifier 29 controls an output torque of the servo motor 11 by means of controlling a driving current for the servo motor 11. The servo amplifier 30 controls a rotation speed of the servo motor 24 by means of controlling a driving current for the servo motor 24. The servo motors 11 and 24 have encoders 31 and 32, respectively, for detecting a rotation speed. The rotation speed detected by the encoders 31 and 32 are supplied to the controller 26.

It is noted that the configuration illustrated in FIG. 1 is for the sake of simplicity and convenience. A specific configuration of the injection device is described in, for example, Japanese Patent Laid-open No. 9-174626.

Figure 2A:
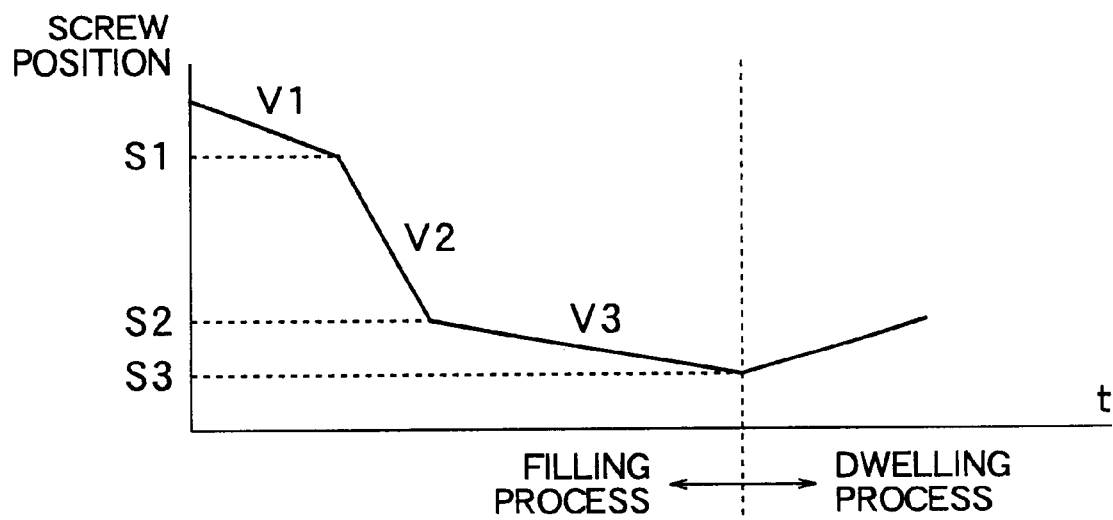
FIGS. 2A and 2B illustrate an example of a conventional screw traveling velocity and screw positions at which the screw traveling velocity is changed.
Figure 2B:
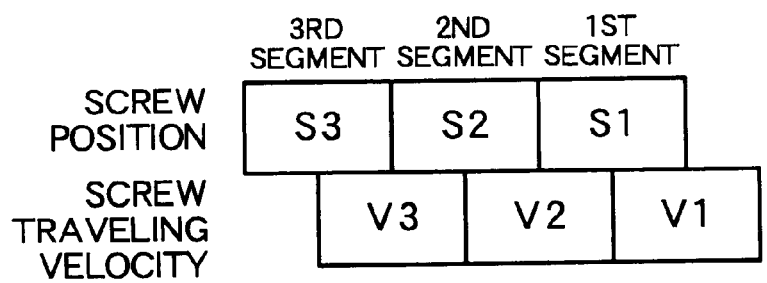

Referring to FIGS. 2A and 2B, a conventional injection control method is described. FIG. 2A shows an example of a screw traveling velocity and a screw position, as a function of time, from the filling process following the plasticization/metering process by the end of the dwelling process. The screw position and the screw traveling velocity are previously determined in two or more segments as shown in FIG. 2B. More specifically, screw 20 travels at a traveling velocity of V1 for a first segment from the beginning of the filling process to the time when the screw position reaches S1. The screw 20 travels at a traveling velocity of V2 for a second segment between the positions S1 and S2. The screw 20 travels at a traveling velocity of V3 for a third segment between the positions S2 and S3. At position S3, the filling process is switched to the dwelling process (V-P switching). The settings for the above are previously given to the controller 26 through an input unit 35 (FIG. 1). The controller 26 controls the switching of the screw traveling velocity in accordance with the above-mentioned settings and a detection signal supplied from the position detector 27.

In FIG. 2B, the relation among the positions at which the velocity is changed is typically as S3<S2<S1. If it is determined accidentally as S2<S3<S1, this means that the screw 20 is retracted during the filling process. The controller 26, however, determines that the setting S3 is an incorrect input and ignores the setting S3 because such retracting is performed in the dwelling process, as apparent from FIG. 2A. The reason the screw 20 is retracted is to avoid defective moldings including flash, by means of reducing the resin filling pressure.

The injection control based on the settings as shown in FIG. 2A is typically suitable for molded articles having a large thickness. After the completion of the filling process, the molded article receives the pressure of the resin. For the molded article having a large thickness, the molded article contracts significantly after the filling process. The application of the pressure to the molded article during the dwelling process can compensate for this contraction.

On the other hand, when this injection control is used for the molding of a thin molded article, an excessive pressure exerted to the molded article may generate flash and/or residual stress, which may result in a flawed or defective article. Therefore, the pressure exerted to the molded article should be reduced. However, conventional injection control methods cannot effectively reduce the pressure suddenly because the maximum traveling velocity or the acceleration of the screw is smaller in the dwelling process than in the filling process. In other words, for molded articles having a small thickness, the resin is contracted less. Although a small volume of resin is required to be supplemented, a large resin pressure is applied continuously to the molded article.

Figure 3A:
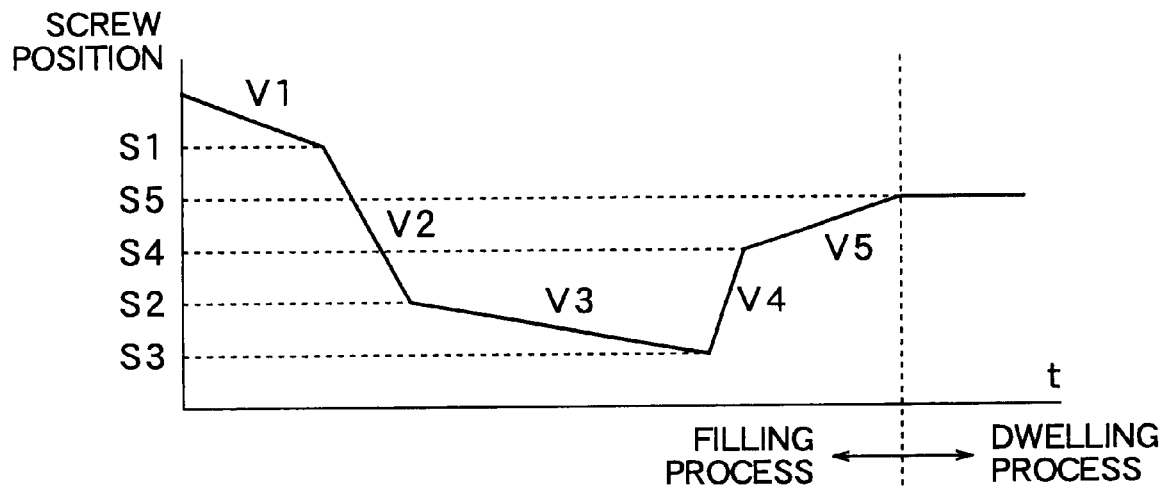
FIGS. 3A and 3B illustrate an example of a screw traveling velocity and screw positions at which the screw traveling velocity is changed, according to a first embodiment of the present invention.
Figure 3B:
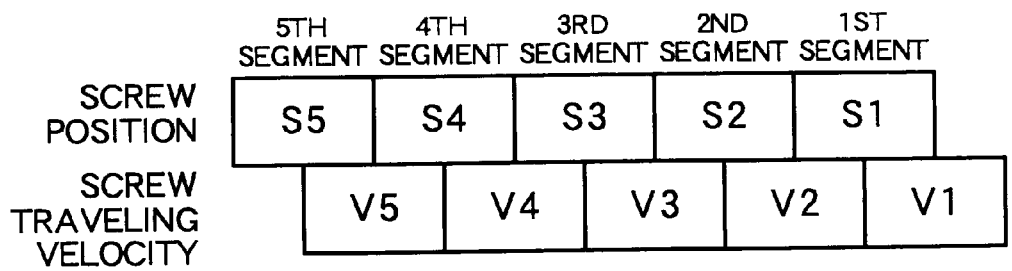

Referring to FIGS. 3A and 3B, an injection control method according to a first embodiment of the present invention is described. Description herein is made for the case where the present invention is applied to a motor-driven injection molding machine similar, for example, to that which is shown in FIG. 1.

In FIG. 3A, a feature of this embodiment includes a step for retracting the screw 20 in the latter half of the filling process before the filling process is switched to the dwelling process. FIG. 3A shows an example of a screw traveling velocity and a screw position, as a function of time, from the filling process following the plasticization/metering process to the dwelling process. The screw position and the screw traveling velocity are previously determined in five segments as shown in FIG. 3B. More specifically, the screw 20 travels forward at a traveling velocity of V1 for a first segment from the beginning of the filling process to the time when the screw position reaches S1. The screw 20 travels forward at a traveling velocity of V2 for a second segment between the positions S1 and S2. The screw 20 travels forward at a traveling velocity of V3 for a third segment between the positions S2 and S3. This is similar in operation to the conventional control method. A difference lies in the subsequent operation during which the screw 20 begins to be retracted at the position S3.

In this embodiment, the retraction is made for the last two segments (i.e., fourth and fifth segments from the beginning of the filling process). The screw 20 travels backward at a traveling velocity of V4 for the fourth segment between positions S3 and S4. The screw 20 travels backward at a traveling velocity of V5 for the fifth segment between positions S4 and S5. At position S5, the filling process is switched to the dwelling process. The relation among the positions at which the velocity is changed is typically as S3<S2<S4<S5<S1.

With the previous settings as described above, the timing at which the step of retracting the screw 20 begins is determined according to the set position of the screw 20 by using the detection signal supplied from the position detector 27.

As described above, not only the forward movement of the screw 20 but also the backward movement of it are allowed during certain segments in the latter half of the filling process, to rapidly drop the resin filling pressure. As apparent from the above, the undesired filling pressure can be reduced by means of the maximum traveling velocity or the acceleration which the injection molding machine has. This provides the advantages of avoiding any flash and of reducing the residual stress in molded articles having a small thickness. It is noted that the molded articles may be varied in weight between the adjacent shots when the screw 20 is retracted during the dwelling process (pressure control). On the contrary, in the present embodiment, the screw 20 is retracted while controlling the velocity or the position during the filling process, so that the weight and the dimension of the molded articles are constant.

Figure 4A:
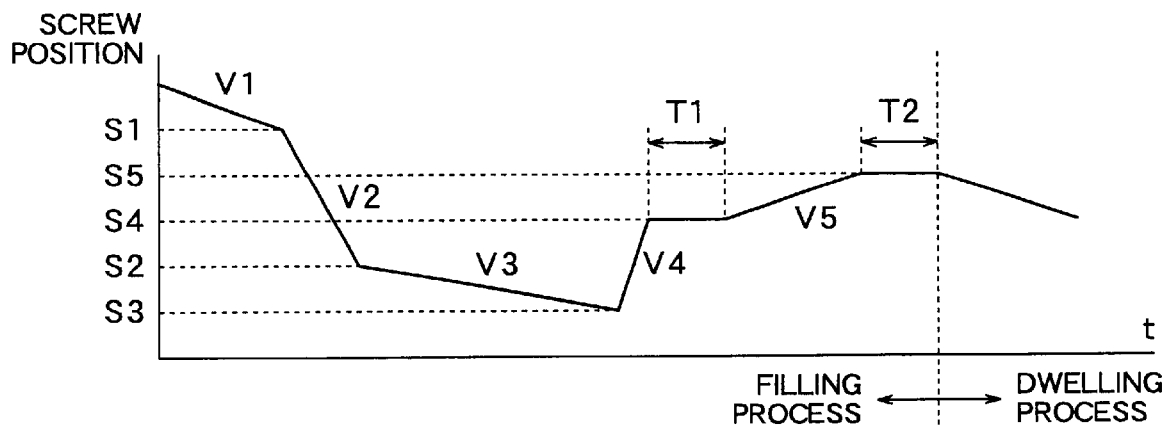
FIGS. 4A and 4B illustrate an example of a screw traveling velocity and screw positions at which the screw traveling velocity is changed, according to a second embodiment of the present invention.
Figure 4B:
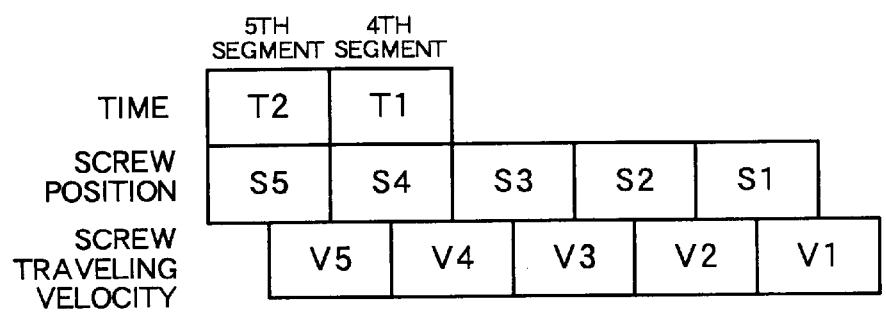

Next, referring to FIGS. 4A and 4B, a second embodiment of the present invention is described. The feature of this embodiment is a step for stopping the screw 20 at least once during the retraction of the screw 20 achieved by two or more segments of the operation. The timing when the operation to stop the screw 20 begins is determined based on a predetermined position of the screw 20. More specifically, the screw 20 travels forward at a traveling velocity of V1 for the first segment from the beginning of the filling process to the time when the screw position reaches S1. The screw 20 travels forward at a traveling velocity of V2 for the second segment between the positions S1 and S2. The screw 20 travels forward at a traveling velocity of V3 for the third segment between the positions S2 and S3. This is completely similar to the operation described in the first embodiment.

Next, the screw 20 begins to be retracted at the position S3. In this embodiment, the retraction is also made for the last two segments (i.e., the fourth and the fifth segments from the beginning of the filling process). The stop operation is set at the end of each retracting segment. As a result, the screw 20 travels backward at a traveling velocity of V4 for the fourth segment between the positions S3 and S4. The screw 20 then stops for a time interval T1 at the position S4. After the elapse of the time interval T1, the screw 20 begins to travel backward at a traveling velocity of V5 for the fifth segment by the position S5. Furthermore, the screw 20 stops for a time interval T2 at the position S5. After the elapse of the time interval T2, the filling process is switched to the dwelling process. The relation among the positions at which the velocity is changed is typically as S3<S2<S4<S5<S1.

Figure 5:
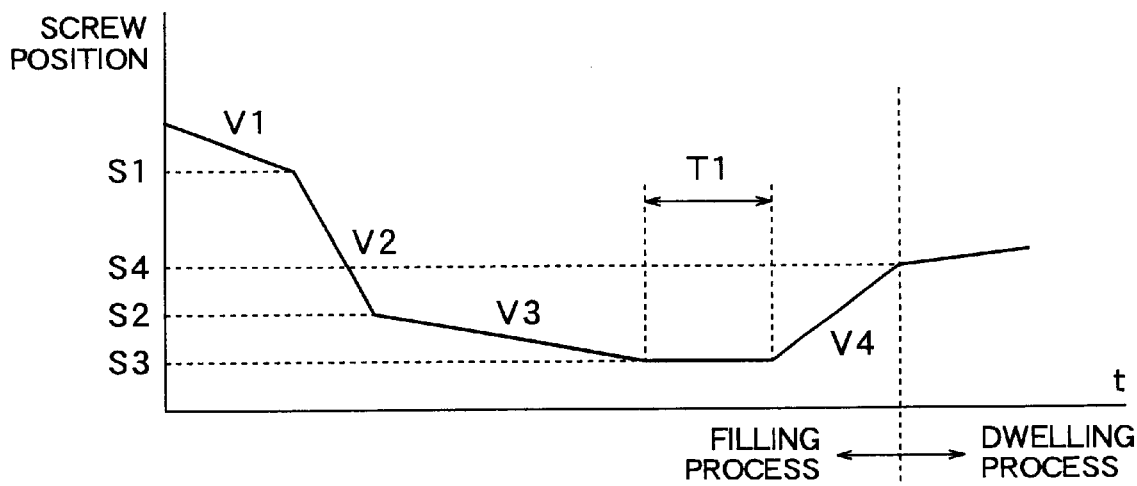
FIG. 5 illustrates an example of a screw traveling velocity and screw positions at which the screw traveling velocity is changed, according to a third embodiment of the present invention.

Referring to FIG. 5, a third embodiment of the present invention is described. The feature of this embodiment is a step for stopping the screw 20 during the latter half of the filling process. The timing when the operation to stop the screw 20 begins is determined based on a predetermined position of the screw 20. More specifically, the screw 20 travels forward at a traveling velocity of V1 for the first segment from the beginning of the filling process to the time when the screw position reaches S1. The screw 20 travels forward at a traveling velocity of V2 for the second segment between the positions S1 and S2. The screw 20 travels forward at a traveling velocity of V3 segment between the positions S2 and S3. This is completely similar to the operation described in the first embodiment.

The screw 20 then stops for a time interval T1 at the position S3. After the elapse of the time interval T1, the screw 20 begins to travel backward at a traveling velocity of V4 for the fourth segment by the position S4. The relation among the positions at which the velocity is changed is typically as S3<S2<S4<S1.

Figure 6:
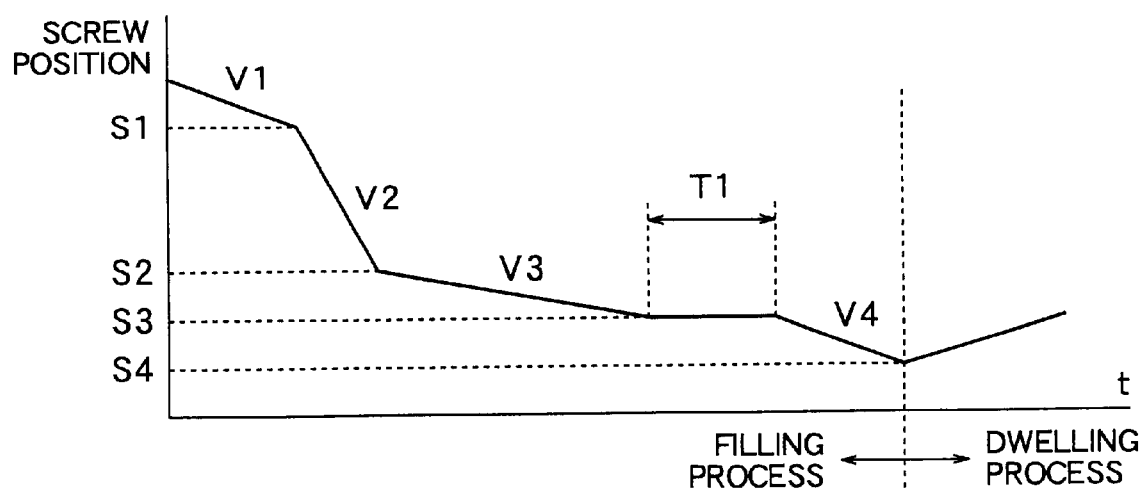
FIG. 6 is a view illustrating a modification of the embodiment in FIG. 5.

It is noted that, as shown in FIG. 6, the screw 20 may be stopped for a time interval T1 at the position S3 and begin to travel forward at a traveling velocity of V4 for the fourth segment by the position S4 after the elapse of the time interval T1. The relation among the positions at which the velocity is changed is typically as S4<S3<S2<S1.

If the screw 20 advances or is retracted suddenly during the latter half of the filling process, a void may be incorporated into the molded article to provide defective moldings, depending on conditions and/or a shape of the molded articles. This is because the traveling flow of the resin cannot catch up with the motion of the screw 20. However, the temporal stop of the screw 20 advantageously stabilize the conditions of the resin.

The filling process in any one of the mentioned embodiments may be switched directly to a cooling process without the dwelling process. The present invention can be applied to hydraulically operated injection molding machines, and also to other configurations of motor-driven injection machines.

As described above, according to the present invention, the screw is retracted during the latter half of the filling process to make it possible to suddenly drop the filling pressure. This advantageously reduces the residual stress on the molded articles having a small thickness in particular. In addition, it is possible to avoid any flash on the molded articles and to stabilize the weight and the dimension of the molded articles.

What is claimed is:

1. A method for controlling injection in an injection molding machine which carries out a molding cycle including a resin plasticization/metering process, a resin filling process and a dwelling process, said method comprising retracting a screw by velocity or position control of the screw only in the latter half of the resin filing process to thereby reduce a resin filling pressure, after completion of the resin filling process, the dwelling process being carried out for pressure control.

2. A method as claimed in claim 1, wherein the timing at which retracting the screw begins is determined based on a predetermined position of the screw, and wherein a retraction velocity for the screw is arbitrarily determined.

3. A method as claimed in claim 2, wherein the retraction velocity for the screw is determined such that beginning of the retraction is performed at a highest velocity of the screw.

4. A method as claimed in claim 2, further comprising stopping the screw at least once during the retraction of the screw.

5. A method for controlling injection in an injection molding machine which carries out a molding cycle including a resin plasticization/metering process, a resin filling process and a dwelling process, said method comprising:
   metering an injection shot into a heating cylinder of an injection molding machine;
   injection at least part of the injection shot into a mold by advancing a screw in an injection direction within the heating cylinder; and
   retracting the screw in a retraction direction within the heating cylinder
   said retracting of the screw being carried out by velocity or position control of the screw only in the latter half of the resin filling process to thereby reduce a resin filling pressure, after completion of the resin filling process, the dwelling process being carried out for pressure control.

6. A method as recited in claim 5, wherein injecting the injection shot comprises controlling a speed of the screw in the injection direction in a plurality of control segments.

7. A method as recited in claim 5, wherein retracting the screw comprises retracting the screw at a plurality of different retracting speeds.

8. A method as recited in claim 5, said method further comprising:
   holding the screw in a fully advanced position for a selected time period after the injection shot is injected into the mold, then retracting the screw in a retraction direction within the heating cylinder.

9. A method for controlling injection in an injection molding machine which carries out a molding cycle including a resin plasticization/metering process, a resin filling process and a dwelling process, said method comprising:

metering an injection shot into a heating cylinder of an injection molding machine;

injecting a portion of the injection shot into a mold by advancing a screw in an injection direction within the heating cylinder; and retracting the screw in a retracting direction by a first selected distance to a first retracted position within the heating cylinder said retracting of the screw being carried out by velocity or position control of the screw only in the latter half of the resin filing process to thereby reduce a resin filling pressure, after completion of the resin filling process, the dwelling process being carried out for pressure control.

10. A method as recited in claim 9, further comprising:

retracting the screw by a second selected distance within the heating cylinder.

11. A method as recited in claim 9, further comprising:

holding the screw at the first retracted position after said retracting for a first selected time period; and retracting said screw by a second selected distance to a second retracted position.

12. A method as recited in claim 11, further comprising a step of holding the screw in the second retracted position for a second selected time period.

13. An apparatus for controlling injection in an injection molding machine which carries out a molding cycle including a resin plasticization/metering process, a resin filling process and a dwelling process, said apparatus comprising:

a pressure sensing unit for sensing an injection pressure of resin in a heating cylinder;

a speed sensing unit for sensing a speed of a screw in the injection cylinder;

stopping and retracting means for stopping and retracting the screw within the heating cylinder; and a control unit for controlling movement of the screw within the heating cylinder and controlling the speed of the screw and to sense a forward speed of the screw based upon signals from the speed sensing unit, and to sense the pressure of the resin being injected into the mold based upon signals from the pressure sensing unit, said stopping and retracting means stopping and retracting the screw based upon said signals, and retracting the screw by a velocity control of the screw only in the latter half of the resin filling process to thereby reduce a resin filing pressure, and after completion of the resin filling process, said stopping and retracting means is controlled by pressure during the dwelling process.

14. An apparatus as recited in claim 13, wherein said control unit is configured to advance the screw at selected speeds by selected distances in a first series of steps, and wherein said control unit is configured to control said stopping and retracting means to stop and retract the screw in a second series of steps.

* * * * *